US005700999A

United States Patent [19]

Streicher et al.

[11] Patent Number: 5,700,999

[45] Date of Patent: Dec. 23, 1997

[54] BAR CODE BASED REFUELING SYSTEM

[76] Inventors: Stanley H. Streicher, 943 Pepperidge Ter., Boca Raton, Fla. 33486; Guillermo A. Warley, 11232 NW. 44th St., Coral Springs, Fla. 33065

[21] Appl. No.: 508,584

[22] Filed: Jul. 28, 1995

[51] Int. Cl.[6] .................................. G06F 7/08; G06K 5/00

[52] U.S. Cl. ............................ 235/381; 235/382; 235/462

[58] Field of Search ..................................... 235/381, 380, 235/382, 382.5, 462; 141/98, 232, 94, 231

[56] References Cited

U.S. PATENT DOCUMENTS

| | | | |
|---|---|---|---|
| 3,629,858 | 12/1971 | Hayakawa | 340/172.5 |
| 3,814,148 | 6/1974 | Wostl | 141/232 |
| 4,072,929 | 2/1978 | Garmong | 340/147 A |
| 4,263,945 | 4/1981 | Van Ness | 141/98 |
| 4,345,146 | 8/1982 | Story et al. | 235/381 |
| 4,347,472 | 8/1982 | Lemelson | 320/2 |
| 4,469,149 | 9/1984 | Walkey et al. | 141/94 |
| 4,967,366 | 10/1990 | Kaehler | 364/479 |
| 5,157,319 | 10/1992 | Klontz et al. | 320/2 |
| 5,202,617 | 4/1993 | Nor | 320/2 |
| 5,327,066 | 7/1994 | Smith | 320/2 |
| 5,359,522 | 10/1994 | Ryan | 364/465 |
| 5,360,139 | 11/1994 | Goode | 222/40 |

*Primary Examiner*—Donald T. Hajec
*Assistant Examiner*—Thien Minh Le
*Attorney, Agent, or Firm*—Malin, Haley, DiMaggio & Crosby, PA

[57] ABSTRACT

A gasoline/diesel dispensing system is disclosed wherein the gasoline or diesel is provided only to authorized vehicle through the use of barcode information disposed on the vehicle. The system can be incorporated into a fixed site location or incorporated into a mobile fuel truck.

11 Claims, 6 Drawing Sheets

BAR CODE BASED REFUELING SYSTEM

BACKGROUND OF THE INVENTION

1. Field of the Invention

The present invention relates generally to a system for dispensing a product, and more particularly, to a bar code based refueling system.

2. Description of the Prior Art

Vehicle fleet operators often experience problems with respect to refueling their vehicles. To lessen such problems, systems have been developed using magnetic cards or electronic keys to permit the holder of such card or key to refuel his or her vehicle. Other systems are based off secret codes. One apparent problem with the use of the magnetic cards or electronic keys, as well as secret codes, is that they are easily transferrable. Thus, an authorized holder of the card or key can pass the card or key to an unauthorized individual or tell the individual his or her secret code, allowing such individual, without the permission of the fleet operator, to refuel his or her own vehicle. With rather large companies, issuing many cards or keys to its drivers, the possibilities for illegal use of the cards or keys is numerous and can quickly add up to a large amount of financial loss to the company.

An example of an automated dispensing system which utilizes a magnetic card is U.S. Pat. No. 3,786,421 issued to Wostl et al. This patent discloses an automated article dispensing system, such as a vehicle service station, capable of dispensing goods in response to activation by an authorized holder of a credit card. The customer inserts the credit card into a control console and the identifying indicia from the credit card is checked to ensure that it corresponds to a valid credit account. If so, the control console is enable to permit the customer to select the goods desired. The system can also require the customer to insert a personal identification code which is checked to verify that the customer is an authorized user of the credit account. The sale price and quantity are applied by the control console to a data bank for billing and inventory. If the credit account is invalid, the credit card is captured by the control console. If the credit account is questionable, the credit card is returned without enabling the selection of goods. Means are included for ensuring that the customer does not forget to pick up his credit card and receipt. Means are also included to provide premiums such as trading stamps and premium tokens.

As another example, U.S. Pat. No. 5,327,066 issued to Smith discloses methods and an apparatus for dispensing a consumable energy source, such as electrical power or liquid fuel, to a vehicle. The vehicle includes an apparatus for coupling the vehicle to a dispenser of the consumable energy source. The vehicle further includes a memory and a coupler for bidirectionally coupling the memory to the dispenser of the consumable energy source for transferring information therebetween. The transfer of an indicia from the memory to a remote site is provided for use in accounting for an amount of the consumable energy source that is inputed to the vehicle. Messages and other information, such as advertisements, can be inputed to the vehicle while coupled to the dispenser. A display is provided for displaying the information to an operator. A data entry device, such as a keyboard, may also be provided for originating information within the vehicle for transmission to a remote site. The local controller includes a microprocessor, a timer, and an analog-to-digital (A/D) converter. During use, a consumer inserts a card having indicia on a surface thereof. The indicia is recorded upon a magnetic stripe. The card reader senses the indicia and provides a digital output to the microprocessor, the digital output being expressive of the information conveyed by the indicia. The microprocessor is bidirectionally coupled to a central controller for transmitting the indicia information thereto such that power or fuel is dispensed and an accounting of the dispensed power or fuel is made.

The prior art fails to provide a system for refueling a vehicle, such as a plurality of automobiles and/or trucks in a fleet of vehicles, wherein the system allows only authorized vehicles to be refueled. It is therefore, to the effective resolution of the aforementioned problems and shortcomings of the prior art that the present invention is directed.

SUMMARY OF THE INVENTION

The present invention provides a bar code based refueling system, wherein a conventional gasoline/diesel dispenser is provided with computer controller circuitry to convert such dispenser into a fuel dispensing and management system. The term "Fixed Site System" (FSS) refers to a computer controlled gasoline/diesel dispenser, the gasoline/diesel dispenser being similar to those found in a gas station. The terms "Bar-Code-Based, Radio-Controlled, Mobil-Refueling System" refer to a method, and the equipment used to implement that method, to provide accurate, efficient, error-free and cost effective on-site refueling of fleets. Only vehicles having a special bar code label may be refueled by the dispenser.

A typical customer of the present invention system is an operator of fleet of vehicles. The operator controls the installation of bar code ID's on each of the vehicles he or she selects from the fleet, if not all the vehicles. The bar code labels are designed such that if they are removed from its associated vehicle, it is destroyed and no longer functional. Therefore, the present invention assures that only designated vehicles are permitted to be refueled. The vehicle ID, time, date, mileage, and number of gallons for the transaction can be recorded on a non-volatile transaction log cartridge for later billing and/or documentation.

In use with the Fixed-Site-System, a driver notes the odometer reading of the vehicle, wherein a display terminal of the system prompts the driver to enter the mileage. The driver either enters the mileage or presses an override key, which is used when refueling gasoline cans, on the display terminal keypad. The system is designed to allow for dispensing of only five (5) gallons of fuel when the override key has been pressed.

The display terminal prompts the driver or user to scan in the vehicle bar code by a bar code scanner gun or wand. The driver brings the bar code scanner gun to the ID label disposed on the vehicle and pulls the trigger which causes a laser beam to repeatedly scan across the label until it verifies the vehicle ID.

The system checks the scanned ID information with a database and/or by decoding the scanned ID information. If the vehicle ID is determined to be valid by the system, the computer system activates the pump motor. The system is designed to give the driver thirty (30) seconds to begin refueling the vehicle. If the driver has not initiated refueling the vehicle within such time period, the pump shuts off and the transaction is cancelled. Furthermore, an interruption in the flow of fuel for more than eight (8) second will also cause the pump to shut off. The transaction which transpired before the pump shuts off is recorded in the transaction log cartridge.

When the driver is finished pumping the display shows the gallons dispensed for approximately ten (10) second and is then ready for the next transaction. The displayed information, as well as additional information (vehicle ID, time, date, mileage, etc.), is also recorded in transaction log cartridge.

In use with the Mobil-Refueling-System, a tank truck, carrying both gasoline and diesel and equipped with equipment utilized for the mobil system, rolls up to the customer's yard gate. The truck's driver scans the yard ID with a hand-held bar code reader attached to a radio modem, to enable the appropriate portion of the computer's database. The driver parks the truck in a convenient location to begin refueling the vehicles located with the yard.

After removing the vehicle's gas tank cap, the bar code disposed on the vehicle is scanned and transmitted back to the on-board computer for checking with a database and/or decoding the vehicle ID information. If the vehicle ID is determined to be valid by the system, the computer system activates the appropriate pump motor. The driver or user is then given a few seconds to begin refueling the approved vehicle, or otherwise the pump shuts off and the transaction is cancelled.

An interruption in the flow of fuel for more than three (3) seconds will cause the pump to shut off and the transaction to be recorded in the transaction log cartridge. The operator (s) has both visual and audible indications that a "good read" has taken place, and limits his or her intervention to scanning the barcode. Thus, it is an object of the present invention to provide a bar code based gasoline/diesel dispensing system.

It is another object of the present invention to provide a gasoline/diesel dispensing system which can only be utilized with authorized vehicles.

It is a further object of the present invention to prevent the theft of gasoline/diesel by drivers of unauthorized vehicles.

It is still another object of the present invention to provide a bar code based gasoline/diesel dispensing system which can be utilized in conjunction with a fixed pump site.

It is yet another object of the present invention to provide a bar code based gasoline/diesel dispensing system which can be utilized in conjunction with a mobile gasoline/diesel fuel truck.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which.

DESCRIPTION OF THE PREFERRED EMBODIMENTS

Figure 1:
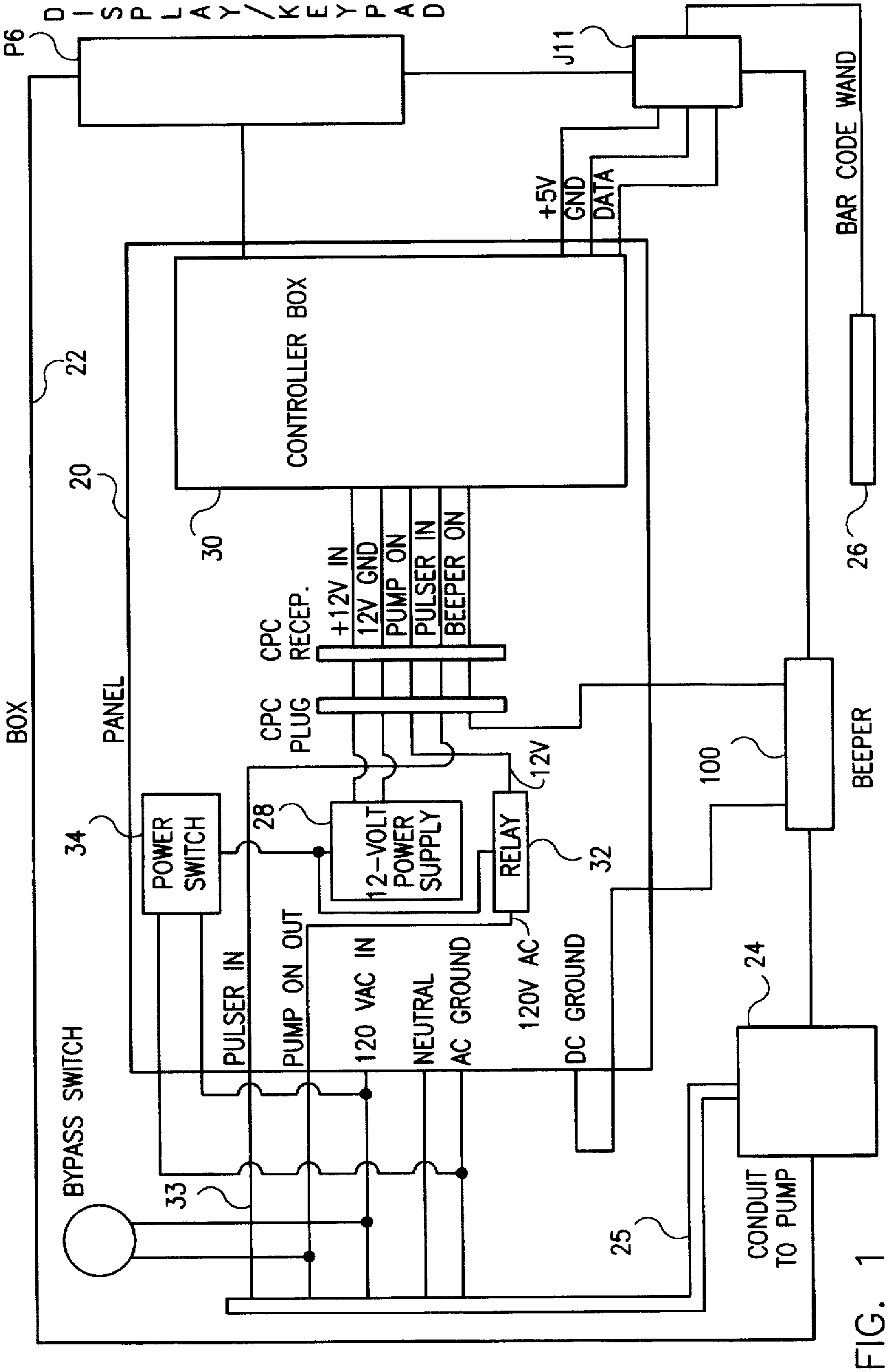
FIG. 1 illustrates a first block diagram of the fixed site embodiment of the present invention.

FIG. 1 generally illustrates the "fixed site" embodiment of the present invention. A panel 20 is shown mounted to a box 22 and acts as the main interface between a pump 24 and a bar code reader or wand 26 to activate and deactivate the fueling system of the present invention. A 12-volt power supply 28 is provided and provides 12-volts in and 12-volts ground to a controller box 30.

A relay 32 is provided wherein to turn relay 32 on, 12-volts is received by relay 32 from controller box 30, causing relay 32 to provide 120-volts AC to turn pump 24 on. A pulser-in signal 33 is received from a photoelectric sensor attached to pump 24. Thus, relay 32 takes the 12-volt pump-on signal from controller box 30 and converts such signal into a 120-volt AC pump-on signal.

Panel 20 receives 120-volts AC from pump 24, while also communicating information to computer/controller box 30 regarding a pulser (not shown) which is mounted on wheel (s) (not shown) that turn as fuel is being dispensed. The pulser can be an auto photodetector having an LED which is mounted on the wheels. The pulser counts the number of teeth on the wheels that pass by it and can be calibrated to provide for a certain number of pulses per gallon delivered from pump 24 to panel 20. As stated above panel 20 is also provided with a main relay 32 which when turned on, via controller box 30, provides AC voltage to turn pump 24's motor on.

Figure 2:
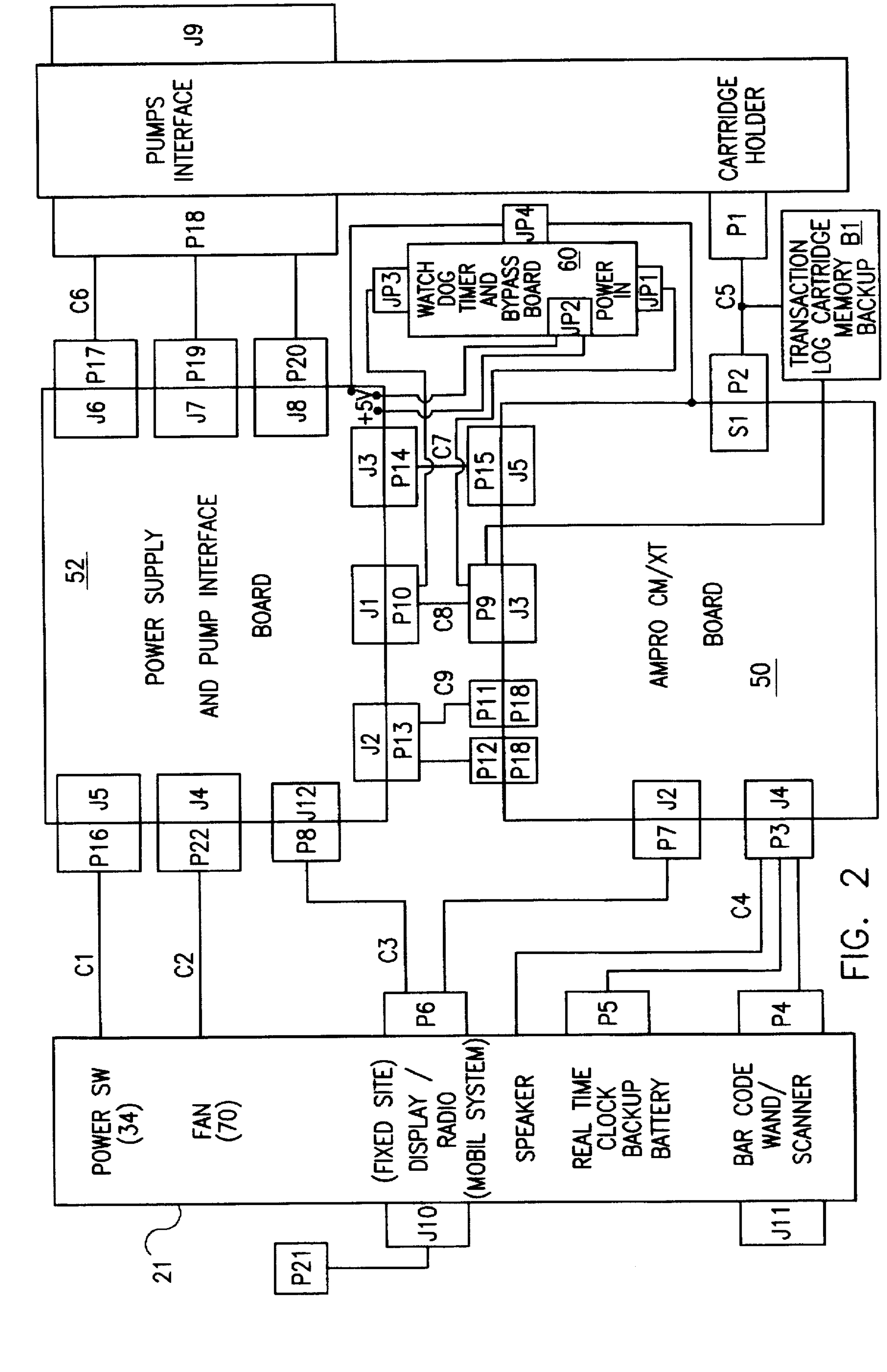
FIG. 2 illustrates a diagram of the controller box embodiment of the present invention.

Controller box 30 is shown mounted to panel 20 by conventional means. Inside box 30, the controller/computer 30 consists mainly of two boards, a computer control board 50 and a power supply and pump interface board 52. The computer is basically an embedded PC type which communicates primarily via serial interfaces, parallel interfaces, and interrupts. As seen in FIG. 2, the boards 50 and 52 are shown having or associated with a plurality of connectors represented by the letter P and numerical indicia (i.e. P3, P7, etc.), receptacles or ports for receiving the connectors represented by the letter J and numerical indicia (i.e. J3, J7, etc.), and cables represented by the letter C and numerical indicia (i.e. C3, C7, etc.). Connectors P plug into corresponding receptacles J. The exceptions to the above representations are P2, which plugs into an I.C. socket (S1) in computer board 50; and P18, which is a socket itself in computer board 50.

With respect to computer control board 50, J2 represents the RS232 serial port, J3 represents the parallel port, J4 represents the utility/keyboard port and J5 represents the power port for computer board 50. Accordingly, P3 represent the utility/keyboard connector, P7 represents the serial connector, P9 represents the parallel port connector and P15 represents power connector for computer board 50. P18 represents the interrupts of computer board, while P11 and P12 represent the interrupt connectors for computer board 50. S1 represents a socket plug, while P2 represents the socket plug connector. P1 represents the cartridge holder and communicates with socket plug S1 via cable C5.

Serial interfaces J2,P7 and J4,P3 are provided and are primarily used to respectively communicate to a display terminal and keypad module, through connector P6 and a bar code wand/scanner, through connector P4, for the user interface. The bar code scanner 29 communicates the vehicle ID information computer 50 simulating a P.C. via keyboard interface port J11.

Thus, as seen in FIG. 2, computer control board 50 communicates with display P6, via serial interface J2,P7. The display module is powered by power supply board 52 through serial interface P8,J12, which is associated with power switch 34 received through JS,P16 of board 52. A battery backup P5 is provided to keep the real time clock accurate during a power shortage. Backup battery PS, as well as a directly wired speaker, also communicate with control board 50 via interface J4,P3.

Display P6, disposed within terminal 21, is powered via cable C3 from J12,P8 of power supply board 52. A fan 70 is provided within terminal 21 and is powered or controlled by interface J4,P22 of board 52, via cable C2. Power switch 34 is also provided in terminal 21 to provide 12-volt power from panel 20 to board 52 at interface J5,P16, via cable C1.

With respect to power supply and pump interface board 52, J5 represents the front panel switch port, which provides either a power on or power off to board 52, while P16 represents the switch connector. J4 represents the fan power port where board 52 supplies power to a fan 70 disposed in terminal 21, while P22 represents the fan power connector.

J12 on board 52 represents the display/radio power port, which provides 5-volt power to the display/radio, while P8 represents the display power connector. Actual signals to the display/radio, via a RS232 interface, are received from serial port J2 of computer board 50.

J2 on board 52 represents the interrupt port, while P13 represents the interrupt connector. The system drives one interrupt per pump 24 used. Pulser signals, that are received from the pump wheel, drive the interrupts. The processor of computer board 50, is interrupted, whenever it receives a pulse at its interrupt port P11,P18 or P12,P18. The interrupt pulse is generated by board 52 whenever a pulse from the pump wheel is received at pulser/meter-in J7,P19 of board 52. Board 50 increments an internal counter within board 50 every time it is interrupted. By incrementing the internal counter, computer 50 eventually determines how many gallons of gas was pumped during the transaction for recording on a cartridge 29. The interrupts are necessary as this gas dispensing information needs to be recorded immediately. The interrupts allow the microprocessor to respond to the external signal received from pulser/meter-in J7,P19 immediately, causing the flow of the system program to be temporarily interrupted.

A transaction log cartridge memory backup B1 can also be provided. Backup cartridge B1 is an exact duplicate, structurally and functionally, to cartridge 29 and is provided in the case of damage or lost of cartridge 29. When a transaction is recorded to cartridge 29, in accordance with the teachings of the present invention, the system at the same time also records the transaction on cartridge B1 as a backup.

J1 on board 52 represent the parallel interface port, while P10 represents the parallel connector. Parallel interface J1,P10 primarily controls turning on and off pumps 24, through circuitry found on pump interface board 52 and shown in FIG. 3. Interrupts J2,P13 also pass through pump interface board 52, which generates interrupts in order to read the meters and count the number of pulses that pump 24 is delivering to determine the number of gallons of gas dispensed, as described above.

Parallel interfaces P9 and P10 for boards 50 and 52, respectively are primarily used as outputs for turning on or off pumps 24 which go through the circuitry. Parallel interface P10, turns off and on relay U13 (FIG. 3) to control pump The signal comes from power supply and pump interface board 52 through the control of computer board 50 via parallel interface P9.

Figure 3:
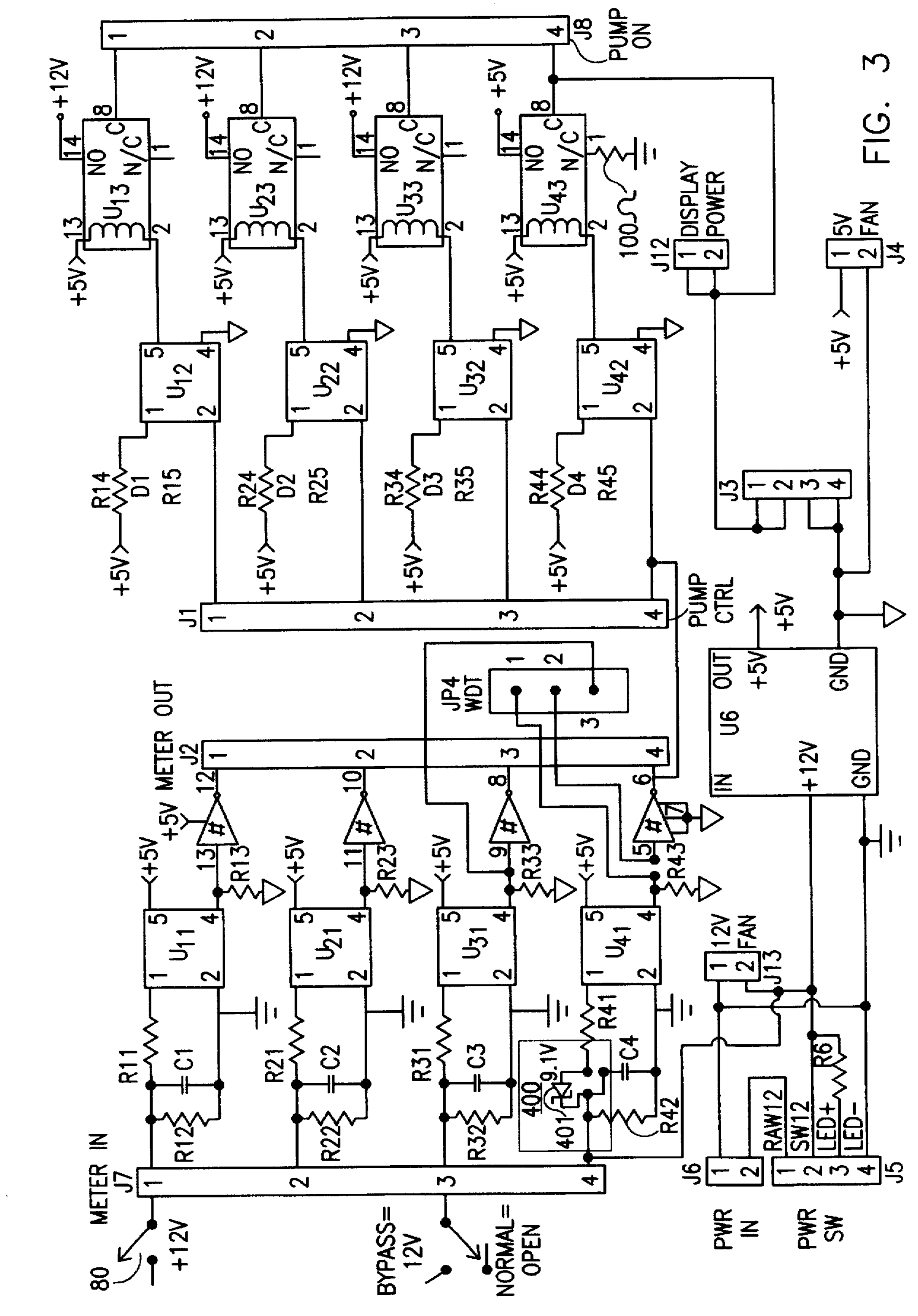
FIG. 3 illustrates an electrical schematic of the power supply and pump interface board of the present invention.

Referring to FIGS. 2 and 3, the pump control is identified as parallel port J1, P10 and has four (4) inputs which come from parallel port J3,P9 on computer board 50. Pump control port J1,P10 communicates with port J3,P9 on computer board 50 via cable C8.

J3 of board 52 represents the power to computer port, while P14 represents the power to computer connector. Power to computer board 50 from board 52 is accomplished via cable C7 from power supply board 52, while the interrupts are communicated between control board 50 (at P18, P11,P12) and pump interface board 52 (at J2,P13) via cables C9.

J8 of board 52 represents the pump-on port, while P20 represents the pump-on connector. J7 of board 52 represents the pulser/meter-in port, while P19 represents the pulser/meter-in connector. J6 of board 52 represents the power-in port, while P17 represents the power-in connector. Pump-on J8,P20, pulser/meter-in J7,P19 and power-in J6,P17 communicate with a pump interface P18 via cables C6.

Board 52 receives 12volt-s of power from pump interface P18 through power in port J6,P17, via cable C6 to power the entire system. Meter/pulser-in J7,P19 receives information from the pulser mounted on the wheel of pump 24. The information received through port J7 from the pulser is eventually processed and used to drive the interrupts of the system via port J2 of board 52.

The pulser generates a pulse which is a 12- switch at the input of meter-in port J7. Thus, when pulses are received from the pulser associated with pump 24, a switch 80 opens an closes as the pump wheel turns. When switch 80 closes, 12 volts is provided at meter in port J7. However, when switch 80 is open, the circuit is broken, and no voltage is supplied at meter in port J7. When switch 80 is closed, the 12-volts are utilized to turn on an optoisolator U11.

As the edges for output out of optoisolator U11 are not perfect, a conventional Schmidt trigger U5 is provided to assure a square output at meter out port J2. Computer 50 requires a clean sharp edge, achieved with Schmidt trigger U5, to detect interrupts. Optoisolator U11, when turned on, provides 5-volts to Schmidt trigger U5. Capacitor C1 is provided as a filter to filter some of the noise passing therethrough. A current limiting resistor R11 is provided, and when opened prevents current from flowing through a LED device of optoisolator U11.

Thus, when the 12-volts, representing an interrupt, is received at meter in port J7, by the closing of switch 80, current flows through the LED of optoisolator U11, turning the phototransistor of optoisolator U11 on, causing 5-volts to go through pin 5 of optoisolator U11. This 5-volts optoisolator output is sent to Schmidt trigger U5. The output at Schmidt trigger U5 is low and having a sharp edge, allowing computer 50 to detect such reading as an interrupt, to increment the internal counter of the system. The system is calibrated to recognize that a certain amount of received pulses equals a gallon of gasoline dispensed. The system increments the counter for each pulse or interrupt receive to determine the amount of fuel that was delivered during the transaction.

Port J6 of power supply board 52 receives power (12 volts) from pump 24. However, as seen in FIG. 3, power in port J6 is associated with power switch port J5 of board 52. Thus, power received through port J6 and power switch port J5 collectively control regulator or module U6. Accordingly, the 12 volts received through port J6 will not energize regulator U6 unless power switch 34 has been turned on.

Thus, 12 volt power is sent to board 52 at port J6. However, unless power switch 34 is turned on, no power is sent to the rest of the system. Thus, raw power is always coming into board 52 at port J6 from pump interface P18, but does not go to the rest of the system unless power switch 34 is turned on. Therefore, initially power switch 34 is turned on to cause the system power to be on.

Regulator U6 is a DC to DC converter with isolated grounds, which are isolated via a transformer disposed within regulator U6. Regulator U6 converts 12 volts DC received through switch port J5 of board 52 from front panel 21, to 5 volts DC to power display/radio P6 through port J12 of board and to power computer board 50 via port J3 of board 52. Regulator U6 takes the 12 volt input and converts regulates such into 5 volts regulated.

A conduit 25 is provided for communication between pump(s) 24 and panel 20. Conduit 25 provides access for the 120 volt AC pump power and pulser information. A keyboard connector J11 is provided which receives the vehicle ID information from laser gun 26. Cartridge 29 is provided which stores the database containing the valid vehicle ID's, as well as information regarding the fuel dispensing transactions. The transaction information is all logged and cartridge 29 is, preferably, pulled once a week to download the transaction information contained therein.

An external buzzer or beeper 100 can be provided as a user of the system can not hear through the speaker provided within box 22, when box 22 is closed. Preferably, external buzzer 100 is provided at the bottom of box 22, though such is not limiting, and is driven by relay U33. The speaker located within box 22 does not have much functionality, with the mobile embodiment, the operator may be a couple of hundred feet away, depending on hose length. With the fixed site embodiment, the speaker is, preferably, enclosed within a stainless steel, waterproof box. As pump 24 kicks in, sound coming from the speaker is nearly impossible to hear. Thus, the speaker is provided only for diagnostic purposes during power out in conjunction with removing cartridge 29. Accordingly, a loud beeper or buzzer 100 is provided, driven by relay U33, and is disposed within box 22, adjacent a hole (not shown) in box 22, in order for the operator of the system, in either embodiment, to hear.

A third utility board 60, operatively associated with boards 50 and 52, can also be provided within controller box 30, for the resetting system in this case of a brownout, software lockup, or some other system malfunction. Power is sent to board 60 from board 52, at connector JP2. Connector JP4 is a miscellaneous interface used for the clock signal/oscillator 206, as well as for other purposes, described below. For instance, when utilizing computer board 50, often the user does not know if board 50, comes up in a high state or a low state when power is initially turned on. If the board comes up low, for about fifteen (15) to twenty (20) seconds pump(s) 24 can be turned on and ready for use without having to provide a vehicle ID.

Figure 4A:
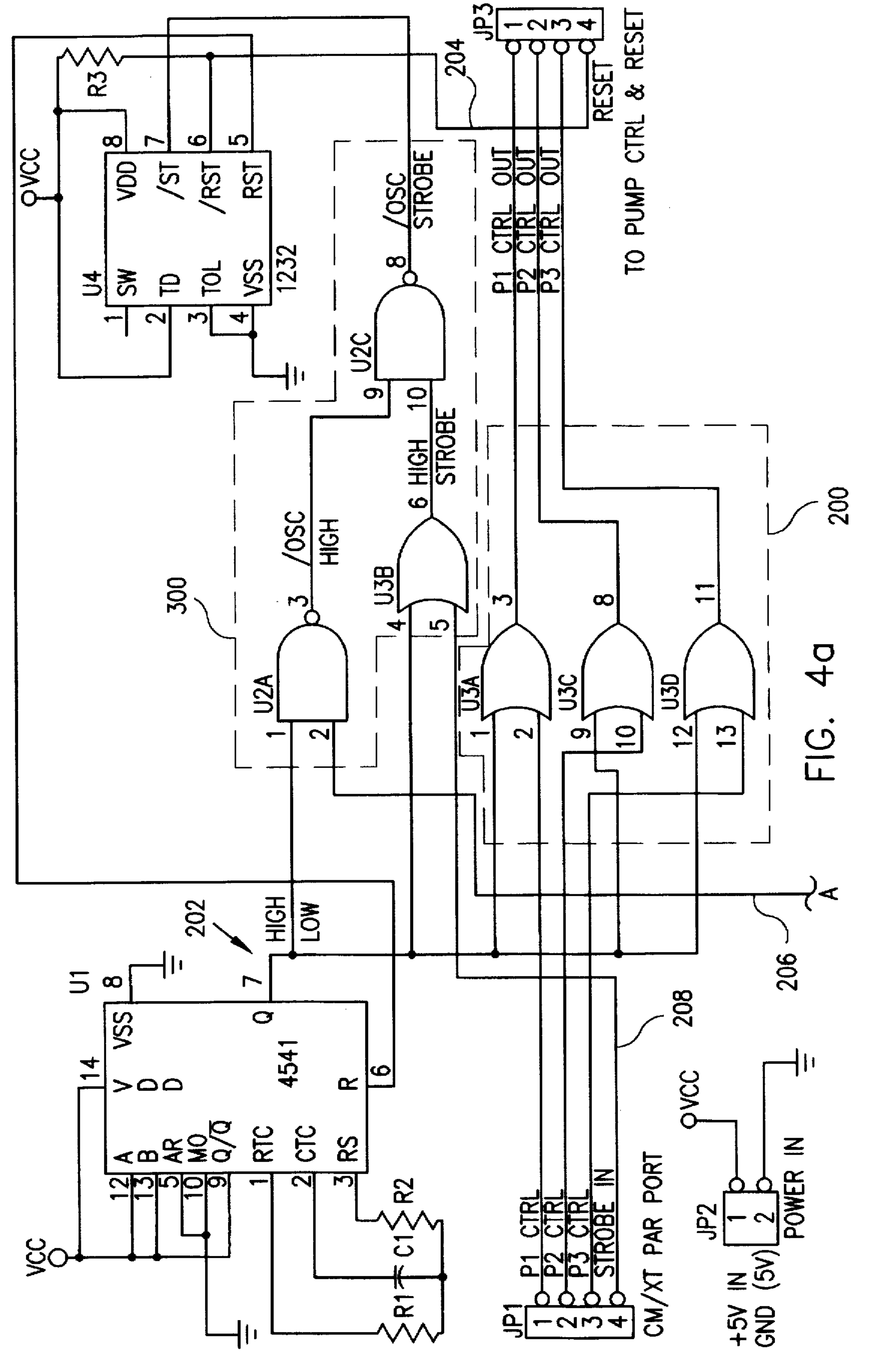
FIG. 4*a* illustrates a first half of an electrical schematic for the utility board of the present invention.

Accordingly, a circuit 200 of board 60 is provided between parallel port J3 of board 50 and parallel port J1 of board 52. Three "or" gates U3A, U3C and U3D are controlled by timer chip U1 to guarantee a known state for pump 24 when power is initially turned on. Timer chip U1 provides a "1" or "high" value, via line 202, as one input to gates U3A, U3C and U3D. As long, as one of inputs to the gates has a value of "1", it doesn't matter what the other input (lines P1, P2 and P3, FIG. 4a, representing initial computer state) is. The output at the gates is always "1" causing pump(s) 24 to be initially off.

The known state for pump 24 continues for certain amount of time, which is determined by the values of capacitor C1 and resistors R1 and R2. Thus, when power is turned on, no matter what state computer board 50 is in, timer chip U1, via line 202, guarantees that pump(s) 24 and buzzer 100 will be off for a period of time, to allow the user to gain control of the system from thereafter.

Board 60 is also provided with a chip U4 which provides a means for automatically recovering when the system locks up. Chip U4 is commonly referred to as watchdog timer, because it waits for the situation where the system software has locked up. When the processor and software of the system are running normally, the system goes through several loops and periodically strobes watchdog chip U4, by producing a small pulse which keeps chip U4 from resetting the system. However, if the system locks up, the system software stops acting normal and also stops strobing watchdog chip U4.

Once enabled, watchdog chip U4 requires the software of system to constantly come back and reset chip U 4. Watchdog chip U4 requires the software to reset U4 within a second or so. If not, then watchdog chip U4 generates a reset and resets board 50, via line 204, which provides a reset pause that makes the processor restart the entire system from the beginning. Thus, watchdog chip U4 is provided to help prevent the software of the system from locking up. Once chip U4 is enabled, it times out about every second and generates a little pulse. The only way to prevent chip U4 from timing out is to put a pause on the strobe input, which causes it to reset and start again.

Chip U4 starts counting one second, and before the occurrence of the one second, the system strobes the input of chip U4. If the input of chip U4 does not get strobed prior to the one second, then a reset pulse will be generated by chip U4, every second. The reset pulse gets fed right back into computer board 50, via line 204 and port JP3, and restarts the system, which is the equivalent of turning the power on.

Thus, watchdog chip U4 guarantees that every second or so, when the system is running normally, a strobe (little pulse) will be generated at chip U4, to keep the system from resetting. If the system has locked up, then the strobe will not be generated within the required second or so, which will cause watchdog chip U4 to send a signal, via line 204, to the system to allow the system to reset itself and get the system out of the lockup mode without user intervention. Therefore, watchdog chip U4 is provided for maintenance to help prevent system lock up situations and allows the system to recover automatically.

As mentioned above, when power to the system is initiated, the user does not have control of the system for the first fifteen (15) to twenty (20) seconds while the system is booting up. During this time period no strobes are generated. However, once power is provided to chip U4, chip U4 is running and expects to receive a strobe from the system. Accordingly, circuitry must be provided to provide a strobe chip U4 until the initial fifteen to twenty second period has elapsed and the system is up and running, and generating it's own strobes. If not, chip U4 will continuously time out, thus continuously resetting the system and preventing the user from ever gaining control of the system for its desired use.

As chip U4 expects to be strobed every second or so, circuitry 300 must be provided to route the signal available on power up, to keep strobing chip U4 during the initial fifteen to twenty seconds after the power has been turned on and before the user gains control over the system, discussed above. Thus, the strobe provided to chip U4, is derived from two possible signals. A first signal that is derived from the processor and the second is from the system, once running (after the initial fifteen to twenty seconds after power has been turned on). While the system is not running, the strobe comes, via line 206, from a signal on computer board 50 that is available immediately when power is turned on. The strobe received via line 206 from computer board 50, prevents chip U4 from resetting the system during the initial fifteen to twenty second, until the program starts running and the strobe is received via line 208.

"Nand" gate U2A of circuit 300 decides which strobe signal gets routed for strobing chip U4. During the first fifteen to twenty seconds, the strobe is generated by board 50 and is sent via clock signal line 206. After the initial fifteen to twenty seconds, the strobe is generated by the system and sent via line 208. Thus, a "high" value appears at pin 7 of chip U1, during the initial fifteen to twenty seconds, allowing clock signal 206 to pass through "Nand" gates U2A and U2C and provide the strobe to chip U4. During this time, clock signal 206 provides the strobe regardless of the value on line 208. After the initial fifteen to twenty seconds, a low appears at pin 7 of chip U1. As such, the value of line 208 will determine if a strobe is provided to chip U4. Each time a low value is on line 208, regardless of the value of line 206, a strobe will be sent to chip U4.

Thus, gates U2A, U2C and U3B (collectively circuit 300) allow a clock signal that comes from board 50, vial line 206, to be utilized as the strobe until the system is running normally. Clock signal 206 is present from the time power to the system is turned on. Once the system is running, a strobe as described above is generated, and gate U2C prevents clock signal 206 from getting through, thus, allowing the system to strobe chip U4 via line 208 and resetting the chip U4, to prevent chip U4 from resetting the system.

Where a brownout has occurred, the voltage may drop enough, without dropping to zero volts, to possibly harm the processor and other components of computer 50. At this point, the system may be inoperable and locked up. Personnel, where the system is installed (fixed system), nay not have access to the system and are usually provided with only a key for a bypass switch. In case something goes wrong, the key allows the system operator to put the system on bypass, which bypasses the computer and allows the pump to be utilized manually for emergencies.

A circuit 375 is provided to detect the user going to bypass momentarily, and for about 400 millisecond, uses a relay to actually turn the power off to the computer. Thus, the user is given means to reset the power without having to get inside box 22. If the system locks up, the user can still quickly reset the system without having to access inside box 22.

Circuit 400 is provided to monitor the quality of the 12 volts being provided. Zener diode 401, in conjunction with resistor R41 and the internal voltage drop between pins 1 and 2 of optoisolator U41, determine a minimum voltage that must be available from the 12 volt input in order to maintain optoisolator U41 triggered. That minimum voltage is approximately 10 volts. If the voltage goes below 10 volts, then not enough current will flow through R41 and into pin 1 of U41 to keep U41 triggered. Consequently, U41 will be turned off.

When U41 is turned off, the voltage on pin 4 goes to ground. This voltage is routed through pin 1 of U6A and it comes back out on pin 2 of U6A, finally reaching pin 5 of the Schmidt trigger. U6A is an analog switch that is normally closed, and is controlled by the voltage on its pin 13. As a result of the LOW voltage on pin 5 of the Schmidt trigger, pin 6 goes to 5 volts, turning off optoisolator U42 by preventing the flow of current through R44. When U42 is turned off, relay U43 is also turned off causing the contact at pin 8 of U43 to switch back to the N/C position, effectively removing the 5 volt power supply from computer board 50 and the display unit and providing instead a path to ground via a one-hundred (100) ohm resistor. This provides for a "clean" removal of power as soon as the 12 volt power supply begins to brownout or turn off, before regulator U6 stops providing a reliable 5 volt output.

With respect to circuit 375, when the bypass key is placed in the BYPASS position, 12 volts is applied to pin 3 of J7, as shown in FIG. 3. This voltage turns on optoisolator U31 causing the voltage on pin 4 of U31 to go to 5 volts. This voltage is fed to pin 4 of USA, causing the/Q output at pin 7 of USA to go LOW for about 400 ms. During these 400 ms, analog switch U6A is now open forcing the voltage on pin 5 of U5 to go LOW through resistor R5. When this voltage goes low, the same effect is produced on U42 and U43 as when the voltage went below 10 volts, thus, effectively removing the 5 volt power to computer 50 and the display unit for about 400 ms.

The computer utilized for the fixed site embodiment is basically the same to the one used for the mobile embodiment. The mobile embodiment eliminates the panel being interfaced to the pump. The mobile embodiment also eliminates the keypad display module and the laser gun. The mobile embodiment, communicates to a radio mounted in the cabin of the fuel truck, side-by-side with the computer. It is to be understood that the exact location within the fuel truck that the radio and computer are mounted is not limited to the cabin an area and other areas of the fuel truck (not shown) are within the scope of the invention. In lieu of a panel to interface the pump, the mobile embodiment provides a junction box in the cabin, which routes wires to where the pumps and meters are located on the fuel truck.

Also in the mobile embodiment, the 12-volt ground and 12-volt power in come directly from the fuel truck's battery to the system and the pulser, preferably, comes from the back of the fuel truck. The pump-on signal is taken by a DC relay that is also preferably mounted at the back of the fuel truck.

To get the vehicle ID information in the mobile embodiment, the operator carries a radio fitted with a conventional bar code reader. When the operator gets close to the vehicle to be refueled, he or she scans a vehicle ID 15 with the bar code reader. The scanned information gets transmitted back, via a modem, to the radio mounted with the cabin area of the truck, where it is decoded and sent via serial interfaces to the computer. The computer then checks the cartridge to assure it is working properly. In the fixed system, the vehicle information is obtained, by the user entering odometer information via display/keypad P6 and using a conventional laser gun to read bar code lb disposed on the vehicle 16 to be refueled.

Once the bar code information is obtained, the operation of the system for either the fixed site embodiment or the mobile embodiment is essentially the same. The same cartridge is utilized for the mobile system and the fixed system. Each time the system reads a bar code, its checked against a database to determine whether the vehicle attempting to obtain fuel is a valid vehicle. The system also determines what type of fuel it takes and turns on the appropriate pump and counts the number of gallons delivered to the vehicle and records the transaction on the cartridge.

With the mobile system embodiment, bar code information representing a yard ID may also be provided, which prevents any fuel from being pumped unless the yard ID is first entered. Larger companies may have more than one yard in which its fleet of vehicles are housed. In such situations, the companies vehicles may be associated with certain yards. To prevent a vehicle which is located at a yard, other than the yard it is associated with, from refueling, the yard ID is first entered and sent to the radio mounted within the cabin area of the fuel truck. If the vehicles yard ID does not match to the yard ID where the fuel truck and vehicle 16 are currently located, then the pumps are prevented from turning on and allowing such vehicle to be refueled. Additionally, the mobile system is designed to time out, after a certain amount of time after the yard ID has been entered, if no vehicle ID is entered.

When turning off the pumps, no user or operator intervention is required. Instead, the system detects the amount of time which has expired in which it has not received any pulses from pulser/meter in J7,P19. If the time reaches, a predetermined time period, the system assumes that user is finish, and turns pump(s) 24 off. Preferably, in the mobile system embodiment, the predetermined time period is four (4) seconds, while in the fixed site embodiment the time period is, preferably, eight (8) seconds. However, these time periods are not limiting, and other time periods may be selected and are within the scope of the present invention.

Thus, the pulses received from pump 24 turn optoisolator U11 on, which after traveling through Schmidt trigger U5 is sent to board 50 as an interrupt. Interrupt P12,P18 or P11,P18 sees the pulse, which starts a timer within board 50. If another pulse is not received before the timer expires (fixed site embodiment—eight seconds; mobile embodiment—three to four seconds), then computer 50 assumes the operator is finished dispensing and immediately turns pump(s) 24 off and records the transaction on cartridge 29.

When pump(s) 24 are on a "low" value is present at pin 2 of optoisolator U12, which turns on relay U13, sending 12 volts to relay 32, which sends 120V AC to turn on pump 24. When the system times out a "high" value is provided at pin 2 of optoisolator U12, preventing current from flowing through the coil in relay U13, thus turning off relay U13 and removing the 12 volts sent to relay 32, and ultimately turning off pump 24.

In use with the fixed site embodiment, an authorized vehicle 16 is fitted with a bar code ID 15, and the vehicle ID is entered within a database of authorized vehicles. The driver of the vehicle pulls up to the pump, wherein the associated display will prompt the driver to enter the vehicle's odometer information. An override key can be provided, for customers of the pump who are refilling a gasoline can, which is tagged with a bar code ID. When refilling the gasoline can, no odometer information is necessary, and by hitting the override key, the user bypasses having to enter such information. However, when the override key has been selected, the system is designed to permit only five (5) gallons of fuel to be dispensed. All information regarding the transaction is recorded on a cartridge. Accordingly, if a user is trying to trick the system, the transaction information is recorded on cartridge 29, requiring the user to explain his or her actions.

Display P6 requests the use to enter the vehicle's odometer or hours, or enter the override key for gas can only. The hours can be provided for vehicles, such as forklifts, which run on hours used instead of miles traveled. The user inputs the requested information and hit enters. At this point, the display tells the user to scan bar code 15, which can be scanned with laser gun 26, or other bar code reading means. The system may be provided with shelter means, such as a little LEXON canopy to protect the fixed site system from the environment, as the system is commonly located out in the open.

Laser gun 26 can be fitted with a sun visor (not shown). Though laser gun 26 is capable of reading the bar code information in the bright sun, the user may not be able to see the red beam from the gun during a bright sunny day. In such case, it may be difficult for the user to point the red beam over the bar code disposed on the vehicle or the yard ID bar code. The sun visor can be constructed to be similar in size to the bar code IDs, so that it is fitted over the label, which correctly aligns the laser gun to the correct distance. The user then positions the laser gun with respect to the bar code label and pulls the laser gun's trigger.

Computer 50 reads the bar code information which comes in through the keyboard input J4,P3 on board 50 from laser gun 26. Prior to reading, computer 50 has been prompting the user by sending commands via serial interface J2,P7 to display P6 and receiving the user's input from punching keys, which is also received through the same serial interface. All the communications between the user and the system via the keypad display are handled through this interface.

Once the user has been prompted, the computer waits for the bar code ID to come in through keyboard interface J4,P3. At this point, the bar code will be received in ASCII format with a preamble to prevent errors. Computer 50 first determines if the preamble is correct and, if so, then proceeds to receive the bar code ID. Computer 50 then performs a first validation of syntax. If the bar code ID is not the right number of digits for example, or if one of the digits is not a number, etc., computer 50 informs the user, via display P6, that the bar code ID is invalid. Furthermore, if the system is associated with a gas pump and the user's vehicle has been tagged as a diesel vehicle, computer 50 will again inform the user, via display P6, of the problem and will prevent fuel from being dispensed. Accordingly, the user is prevented from pumping the wrong type of fuel in vehicle 16, assuming that vehicle 16 has been tagged correctly. In such case, display P6 will shown "Invalid I.D." on its screen, and the system can be designed to wait for the user to continue up to 30 seconds. If in 30 seconds the user fails to enter a valid ID, the system can be designed to return to the beginning where it prompts the user to enter odometer or hour information.

To ensure a valid I.D. has been received, computer 50 communicates with cartridge 29 and searches the database to determine if vehicle 16 is authorized or not. Cartridge 29 is memory mapped into the memory of computer 50. Computer 50 has a certain amount of memory that it can address. A piece of that memory is mapped into the cartridge and the processor, similar to writing to a certain area of memory. Cartridge 29 is a non-volatile cartridge and is transparent to the user.

When a valid ID is received, display P6 indicates such, and three very distinctive beeps are provided from buzzer 100. It is to be understood that three beeps from buzzer 100 are not limiting, and other number of beeps are within the scope of the present invention. The three beeps from buzzer 100 are clear and distinctive to indicate to the user, the pumps are ready for use. As stated above, buzzer 100 is driven through relay U33.

In use, 12-volt power-in comes through port J6,P17. To enable the power to the rest of the system, power switch 34 is turned on. Once power is turned on, regulator U6 takes the 12-volts in and converts it into regulated isolated 5-volts. The 5-volts are routed to fan 70, the rest of the components on boards 50 and 52, and to display P6 (fixed site embodiment).

With the power up, the processor goes through a process of resets and the program is loaded. The system boots up and starts running the loaded program. During this initial time, circuit 200 kicks in, to make sure on power up, that it routes a "high" value, from chip U1, immediately to "or" gates U3A, U3C and U3D, to prevent any of pump(s) 24 from turning on, before the system program can be controlled. The same "high" value also routes an oscillator/strobe pulse coming from clock signal line 206 to watchdog timer chip U4, so that chip U4 keeps getting strobed, to prevent chip U4 from resetting the system during the initial fifteen to twenty seconds that power has been turned on.

After the initial fifteen to twenty second time period, chip U1 switches to a "low" value, which prevents the strobe coming from clock signal line 206 from getting through to chip U4, while also allowing a signal from line 208, that the system's software generates to get through to reset the watchdog timer chip U . The "low" value from chip U1 also is sent to "or" gates U3A, U3C and U3D to allow the system to determine, by signals coming from JP1, when pump(s) 24 will be turned on. Thus, after the first fifteen to twenty seconds, circuits 200 and 300 are irrelevant to the operation of the system.

If the system detects that the 12-volt power supply has dropped below approximately 10-volts, zener circuit 400 will detect such and turn on optoisolator U41, which drives the associated meter out port J2 to a "low" value. This "low" value, causes a "high" value at pin 2 of optoisolator U42 to turn optoisolator U42 off, preventing current from flowing therethrough. The prevention of current flow, causes relay U43 to switch from its normally closed position, to an open position. Relay U43 is used to route 5-volts to computer board 50 and display P6. Thus, when relay U43 is opened it prevents the 5-volts from getting routed to board 50 and display P6, causing such to go off, as if the power had been turned off.

Once the program is running, it waits to receive a valid vehicle ID from the user. The vehicle ID information comes through RS232 port J2,P7 into computer 50. In the case of the fixed site embodiment, the information comes through display/keypad P6 and keyboard P4 of terminal 21 that the user has access to. In case of the mobile embodiment, the information comes by radio transmission to cabin radio P6, from the operator who has scanned the identification information on the vehicle. Cabin radio P6 converts the information into serial information and sends the RS232 serial information to computer board 50.

Computer 50 determines whether the received information is a valid vehicle ID or not, and does such, based on the format of the ID or on the database of IDs stored in cartridge 29. If computer 50 receives a valid ID it will turn on the corresponding pump 24, by driving its associated relay, i.e. relay U13 or U23. The vehicle ID provides information on which pump 24 should be turned on. In the fixed site embodiment, preferably, only a single pump 24 is utilized. However, in the mobile embodiment, the fuel truck could have up to three pumps.

To turn pump 24 on, computer 50 drives parallel port J1,P10 placing a "low" at pin 2 of optoisolator U12, causing current to flow through a LED within optoisolator U12, which in turn turns on a transistor also disposed within optoisolator U12, thus turning on optoisolator U12. Turning on optoisolator U12 allows current to flow through the coil of relay U13, which causes a mechanical switch disposed within relay U13 to change from its normally open position to a closed position. Relay U13, preferably is an electromechanical relay and provides 12-volts to pump on port J8,P20, which in the mobile embodiment gets routed out of the box and goes to the back of the fuel truck to a solenoid that turns the appropriate pump 24 on. In the fixed embodiment, the 12-volt signal simply turns the appropriate pump 24 on. Thus, in either embodiment, turning relay U13 on provides 12-volts to pump 24 to ultimately turn pump 24 on.

Specifically, the 12-volts is sent to relay 32 to turn on the relay and send 120V AC down to pump 24, causing the pump motor (not shown) to be on. After the pump has been turned on, pump acts like a conventional gas pump, until it is turned off. The user can be required to turn a handle (not shown), associated with the pump, to reset the mechanical counter, which at that point, computer 50 waits to receive pulses from pulser/meter-in J7,P19.

Once pump 24 is on, the system is set to receive interrupt pulses through P12,P18 and P11,P18, which come in from the pulsers. The interrupt pulses are received at meter in port J7,P19 and sent through an optoisolator, such as optoisolator U11. A schmidt trigger U5 is provided to shape the signal received from optoisolator U11 to a square pulses, which are seen at meter out/serial port J2,P13, thus generating interrupts to the processor. The processor within board 50 receives the interrupts and increments an internal counter that keeps track of the number of gallons being dispensed during the transaction.

This operation of the system will continue until the processor recognizes that it has not receive any pulses for a certain amount of time. The amount of time depends on which embodiment is being utilized. When the predetermined time period has been reached with the processor receiving no interrupt pulses, the system times out, and turns off pump 24, as described above. This is achieved by providing a "high" value at pin 2 of optoisolator U12, to prevent current from flowing in the coil relay U13, causing the switch in relay U13 to change from its closed position back to its open position, thus, removing the 12-volts being sent to pump 24 to turn such pump on. At such time, the transaction (vehicle ID, number of gallons, date, time, etc.) is recorded in cartridge 29.

The system allows for control of up to three pumps at a time. However, for most situations a single pump is only required. Furthermore, all relevant information shown on display P6 can be simultaneously recorded on cartridge 29.

When the user presses the nozzle associated with the gas pump, the wheels on the mechanical device in the pump start to turn. Once the wheels start turning, the computer receives pulses through the pulser that is fitted in the pump. The pulses are received at meter in J7, and ultimately turn on optoisolator U11, as described above. Schmidt trigger ensures that a clean 5 to 0v pulses are provided, so computer 50 can detect such voltage output as interrupt.

Every time an interrupt is received, the processor stops what it's doing to update an internal counter. Preferably, the system is designed so that for approximately every forty (40) pulses received, one gallon of fuel has been dispensed. In such case, for every 4 pulses or so, 1/10 gallon of fuel is dispensed, and such resolution is displayed on display module P6 . Thus, every 4 pulses or so, the information shown on display P6 is updated. Furthermore, as the information shown on display P6 is being updated, so is the information being recorded on cartridge 29.

The information continues to be updated until eventually no further pulses are received. However, every time an additional pulse is received, the system resets the time that informs the system that there's no more pulses coming through. Preferably, the time selected for the fixed site embodiment is eight (8) seconds. Thus, if no pulses have been received for about 8 seconds, then the system shuts off the relevant pump 24.

Figure 4B:
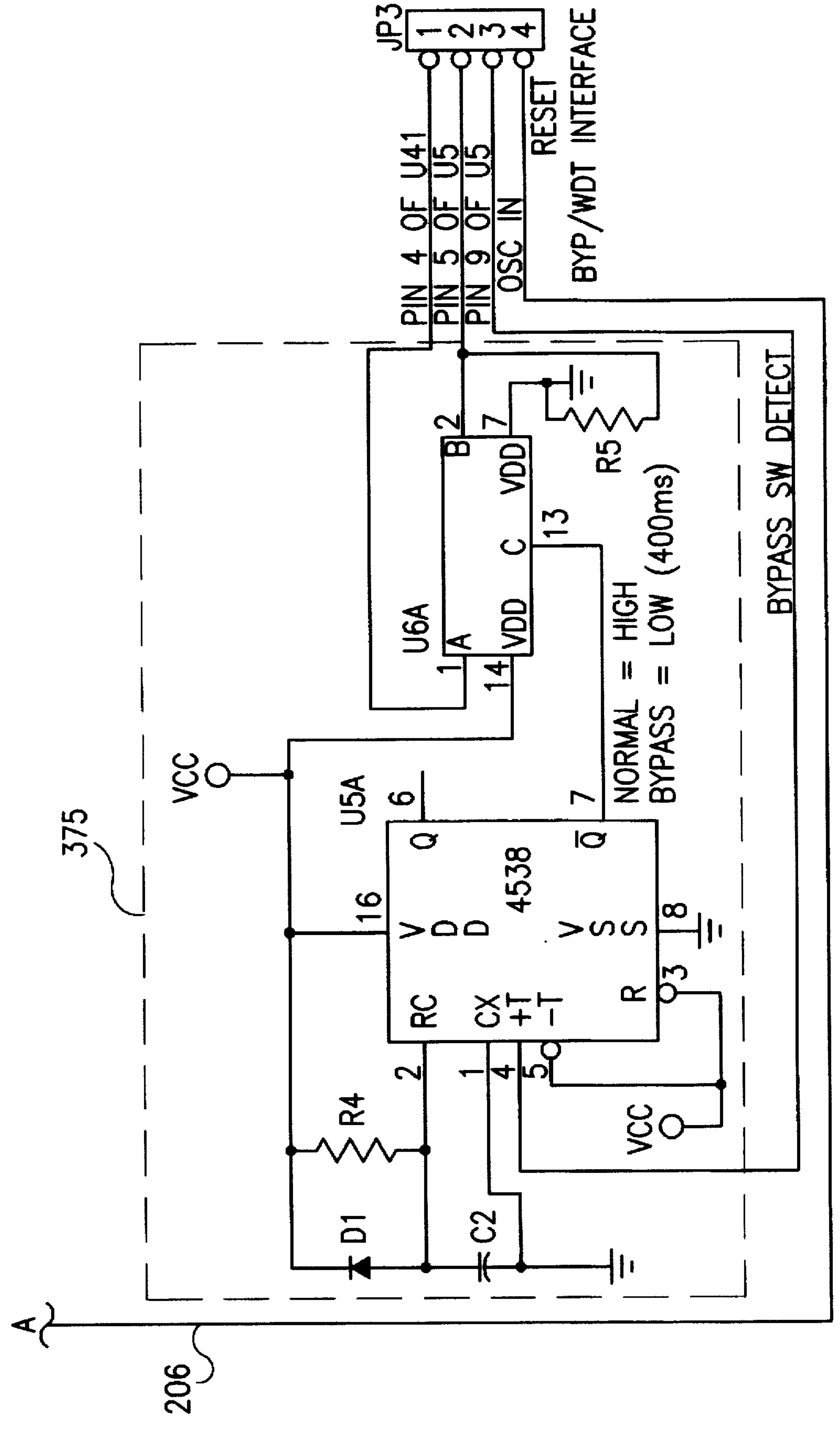
FIG. 4*b* illustrates a second half of the electrical schematic for the utility board of the present invention.
Figure 5:
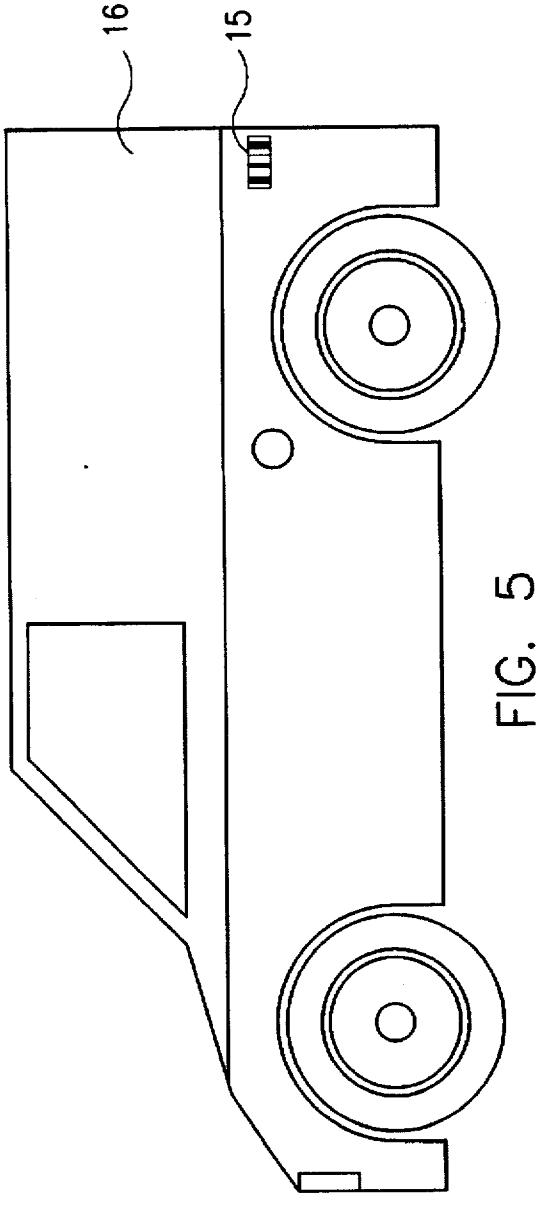
FIG. 5 illustrates a conventional vehicle having bar code identification disposed thereon in accordance with the teachings of the present invention.
Figure 6:
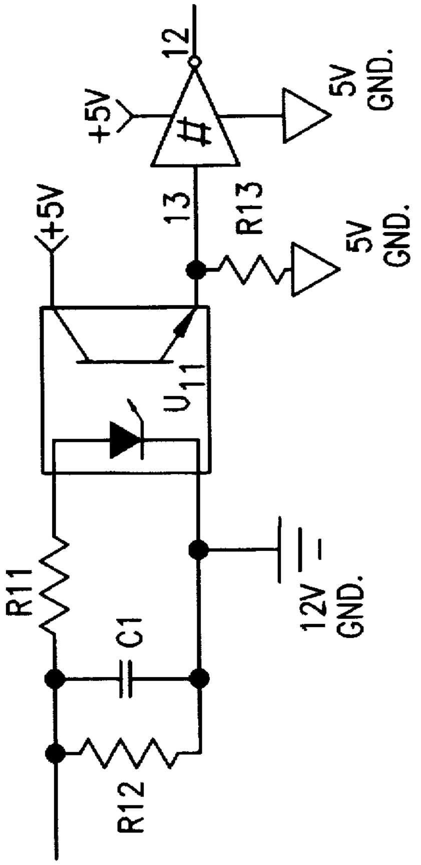
FIG. 6 illustrates a cutaway view of a portion of the interrupt circuitry in accordance with the present invention and also showing the internal components of an optoisolator utilized with the present invention.

The circuits shown in FIG. 4a and 4b come into play only under failure and are provided as a fail safe recovery mechanism. During normal operation and after the initial fifteen to twenty seconds, circuits 200,300,375 and 400 do not come into play and are irrelevant with respect to normal operation of the system.

When pump 24 is turned off, the number of gallons that has been dispensed is displayed for a few seconds, and a final record of the transaction is stored in cartridge 29, which can include the vehicle I.D., the odometer information that was entered, the number of gallons dispensed, the time, and the date. The system then reverts back to an idle display waiting for the next user.

In use with the mobile embodiment, a fuel truck drives to the yard of the customer, where a fleet of vehicles are housed. The system (computer and radios) is normally already on by the time the driver arrives at the yard. Thus, the system is sitting in an idle state, waiting to receive information via the radio. When the driver of the fuel truck arrives at the yard, he or she with his or her radio and bar code reader, reads the bar code for that particular yard. The bar code information gets transmitted via the radio to the cabin radio. Each radio that the driver carries has its own I.D. so the computer always knows from which radio the information was received.

Once a valid yard ID is obtained, the information is sent to computer 50, so the computer knows where to search in the database for the authorized vehicles. The driver drives the fuel truck into the yard and parks the truck in a central location and starts unwinding the fuel hose. The hose is usually about 200 ft. long.

At this point, the system is ready to receive vehicle ID information, similar to the fixed site system, to ensure only authorized vehicles located at the yard are being refueled. The vehicle ID gets transmitted back via the radio interface to the computer and the computer communicates with the cartridge to validate the information. If the information is valid, then the system turns on the appropriate pump and waits to receive from the meter the pulses in exactly the same way that it does for the fixed site embodiment. The only difference is with the mobile embodiment, the system does not record the date and time for every transaction. Instead, the system records the time the fuel truck gets to the yard. Preferably, the cartridge is turned in every night. However, such is not limiting.

The fixed site embodiment may also be utilized at various commercial gas stations throughout the country, to allow an authorized vehicle, which is not in the vicinity of its home base, to be refueled. The fixed site system can be in communication with a central location, via a conventional modem or phone line, which will verify that the vehicle is authorized and which will receive the transaction information once the vehicle is refueled. Thus, remote tracking of vehicle location and refueling information via phone and/or radio may be accomplished.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for refueling only authorized vehicles, comprising:

means for reading bar code information disposed on a vehicle to determine if said vehicle is authorized for refueling;

means for enabling a fuel pump if a valid vehicle identification is read by said means for reading;

means for disabling said fuel pump after a predetermined time period; and means for guaranteeing the fuel pump is disabled when the system is initially powered.

2. The system for refueling of claim 1 further including means for recording a transaction of how much fuel was dispensed during the refueling of said authorized vehicle.

3. The system for refueling of claim 1 wherein said system can be used in conjunction with a fixed fuel pump or a mobile fuel truck.

4. A system for dispensing gasoline or diesel for a refueling of an authorized vehicle, comprising:

means for reading bar code information disposed on a vehicle to determine if said vehicle is authorized for refueling;

means for enabling an appropriate gasoline or diesel pump if a valid vehicle identification is read by said means for reading;

means for disabling the gasoline or diesel pump if no gasoline or diesel has been dispensed for a predetermined time period;

means for recording a transaction of how much gasoline or diesel was dispensed during the refueling of said authorized vehicle;

means for guaranteeing the gasoline or diesel pump is disabled when the system is initially powered.

5. A system for dispensing gasoline or diesel for a refueling of an authorized vehicle, comprising:

means for reading a bar code disposed on a vehicle, said bar code representing information regarding the vehicle;

computer means for determining if said vehicle associated with the bar code is authorized for refueling, said computer means operatively associated with said means for reading to received the information read by said means for reading;

means for enabling an appropriate gasoline or diesel pump when a valid vehicle identification information is received by said computer means;

means for disabling the gasoline or diesel pump if no gasoline or diesel has been dispensed for a predetermined time period;

means for recording a transaction of how much gasoline or diesel was dispensed during the refueling of said authorized vehicle;

means for guaranteeing the gasoline or diesel pump is disabled when the system is initially powered.

6. A system for dispensing gasoline or diesel for a refueling of an authorized vehicle, said system utilized in conjunction with a fixed gasoline or diesel pump or with a mobile fuel truck, said system comprising:

means for reading a bar code disposed on a vehicle, said bar code representing information regarding the vehicle;

computer means for determining if said vehicle associated with the bar code is authorized for refueling, said computer means operatively associated with said means for reading to received the information read by said means for reading;

means for enabling an appropriate gasoline or diesel pump when a valid vehicle identification information is received by said computer means;

means for disabling the gasoline or diesel pump if no gasoline or diesel has been dispensed for a predetermined time period;

cartridge means for recording a transaction of how much gasoline or diesel was dispensed during the refueling of said authorized vehicle;

display means for entering additional information regarding the authorized vehicle;

means for automatically resetting the system when the system locks up;

means for guaranteeing the gasoline or diesel pump is disabled when the system is initially powered; and means for monitoring power being supplied to said system.

7. The system for dispensing of claim 6 wherein said system, in conjunction with a modem or phone line, can be utilized at various commercial gasoline stations nationwide to provide remote tracking of vehicle location and refueling information.

8. A method for refueling an vehicle, said method comprising the steps of:

(a) reading a bar code disposed on said vehicle;

(b) determining if said vehicle is authorized for refueling based on information represented by the bar code disposed on the vehicle;

(c) enabling a fuel pump if said vehicle is authorized;

(d) disabling the fuel pump after a predetermined amount of time; and (e) guaranteeing the fuel pump is disabled during initial powering.

9. The method of claim 8 further including the step of recording how much fuel was dispensed during refueling of said vehicle.

10. The method of claim 8 further including the step of inputing additional information regarding the vehicle.

11. A system for refueling only authorized vehicles, comprising:

means for reading information disposed on a vehicle to determine if said vehicle is authorized for refueling;

means for enabling a fuel pump if a valid vehicle identification is read by said means for reading;

means for disabling said fuel pump after a predetermined time period; and means for disabling the fuel pump when the system is initially powered.

* * * * *